(12) United States Patent
Paselsky et al.

(10) Patent No.: US 6,516,938 B1
(45) Date of Patent: Feb. 11, 2003

(54) LANE GUIDE

(75) Inventors: John M. Paselsky, Hebron, KY (US); Matthew R. Lukes, Independence, KY (US)

(73) Assignee: R.A. Jones & Co. Inc.

( * ) Notice: Subject to any disclaimer, the term of this patent is extended or adjusted under 35 U.S.C. 154(b) by 0 days.

(21) Appl. No.: 09/631,315

(22) Filed: Aug. 3, 2000

(51) Int. Cl.⁷ .............................................. B65G 47/26
(52) U.S. Cl. .................. 198/419.3; 198/453; 198/836.4
(58) Field of Search .................. 198/419.3, 452, 198/453, 836.4, 836.3; 53/249–252, 448, 479, 458, 566, 531, 534, 48.1, 48.5, 543

(56) References Cited

U.S. PATENT DOCUMENTS

| | | | | |
|---|---|---|---|---|
| 2,422,726 A | * | 6/1947 | Goldacker | 198/836.3 |
| 4,470,499 A | * | 9/1984 | Sijbrandij | 198/836.3 |
| 4,623,059 A | * | 11/1986 | Agnew | 198/452 |
| 5,546,734 A | * | 8/1996 | Moncrief et al. | 198/836.3 |
| 5,937,995 A | * | 8/1999 | Hartness et al. | 198/453 |

* cited by examiner

Primary Examiner—Joseph E. Valenza
(74) Attorney, Agent, or Firm—Wood, Herron & Evans, LLP (57) ABSTRACT

An improved apparatus useful in feeding articles from a bulk supply through lanes confining articles into single file for metering and segregation from upstream articles. The apparatus includes a lane guide insert removably mounted on one of two opposed preferably fixed lane guides. The insert narrows or constricts the effective lane width through a selected length, and as a function of the diameter of the articles handled. The maximum width between the fixed lane guides of a lane is that which will permit passage of the smallest pre-determined diameter of articles to be handled without forming an "A" pattern orientation in the lane.

21 Claims, 5 Drawing Sheets

LANE GUIDE

BACKGROUND OF THE INVENTION

This invention relates to cartoning of articles and more particularly to cartoning of containers such as cans and bottles where the containers are formed into groups which are packaged in cartons.

In container cartoning, it is known to convey a bulk supply of containers downstream toward a cartoning station. Along the way, the containers are directed or constrained into individual lanes which are defined by adjustable lane guides. The containers are then segregated from the infeed lanes into select count rows which are then typically grouped with other rows for insertion into cartons as container groups.

There are numerous devices known to segregate containers into rows. For example, a respective star-shaped wheel near the discharge ends of each infeed lane can be used to meter and separate containers, captured or guided between lane guides. The metered containers are formed into rows with spaces between the containers. The content rows are then grouped with other rows for cartoning.

One such form of star wheel metering and separation is shown in U.S. Pat. No. 6,105,338, expressly incorporated herein by reference.

In another form of row separation, moving intermediate transfer guides are introduced into spaces between containers at a discharge end of the bulk infeed lanes to separate a select count row of preceding containers. One such form of intermediate transfer guide metering is shown in applicant's copending U.S. patent application Ser. No. 09/584,335 entitled "CARTONER WITH INTERMEDIATE TRANSFER, filed on May 31, 2000, expressly incorporated herein by reference.

In yet another and different form of row separation, flight bars comprising or extending from walls of group buckets of a bucket conveyor are inserted between containers to segregate a select count of downstream-most containers from the infeed lane as the buckets move downstream. Such a system is shown in U.S. Pat. Nos. 5,666,789; 5,692,361; 5,241,806 and 3,778,959 for example, each of these also being expressly incorporated herein by reference for background.

Whatever system is employed to meter and segregate containers for grouping, it has also been a desire to provide a container cartoner with the capacity to handle containers of varying diameters. Thus, in one aspect of these systems, the container feeding apparatus is adjusted to accommodate the particular diameter of the particular containers to be cartoned in a particular session or run. Such adjustment is necessary, particularly in the width of the container lanes between the respective lane guides. As the containers are fed from a bulk feed area they are separated into lanes defined by guides which are spaced apart a distance which is approximately equal to the container diameter, plus an acceptable tolerance for smooth feeding. If the lanes are too wide, however, the containers may be staggered indiscriminately as they are conveyed down the lanes. In other words, the centers of the containers may be offset from the center line of the container lane by some distance.

There are two problems presented by staggered containers in the feed lanes. First, if the center of the container is allowed to move off the lane center line so far that the angle between lines drawn from center-to-center of adjacent containers on opposite sides of the lane is 60 degrees or more from the lane center line, an "A" pattern bridge of containers is formed which could lead to feed blockage in the lane. Second, where the containers are staggered in a wide lane so the distance between their centers in the machine direction is less than the approximate diameter of a container, the spaces between the containers may not be appropriately indexed or predictable with the separation or metering device, such as a star wheel, transfer guide or flight bar. The entry end of these devices could thus hit a container obliquely, rather than the space between two adjacent containers, and puncture it or jam it against the far side lane guide and jam or block further feeding in that lane.

Accordingly, in the past, the usual solution has been to provide adjustable lane guides which can be adjusted to move the lane guides respectively toward or away from each other to provide an optimum lane width approximately equal to container diameter and a small additional tolerance. This controls the configuration or orientation of multiple containers in the lane so that the spaces between the containers are disposed predictably on centers which are about equal to a container diameter for the particular container in use, i.e. so the center of the containers move generally along the center line of the lane in the flow direction of the lane.

Such lane guides are typically mounted on and carried by an adjustable overhead frame which overlies the infeed area of the bulk container and lane infeed. Thus, the adjustable lanes and the structure of the lanes extends back upstream from the container metering, segregating and discharge area all the way to the mass infeed at the entry end to the lanes. The overhead frame structure blocks easy access from above the container conveyor under the guides and makes it difficult to clear fallen or defective containers, broken container pieces and the like.

Accordingly, it has been one objective of the invention to provide an improved apparatus for feeding containers of varying diameters as fed into a cartoner.

A further objective of the invention has been to improve the handling of containers of varying diameter in lanes for feeding containers downstream.

A further objective of the invention has been to provide improved lane guide apparatus for handling containers or articles moving downstream.

A further objective of the invention has been to provide improved lane width adjustment for conveyed articles.

A further objective of the invention has been to provide an improved cartoner for articles of varying sizes.

A yet further objective of the invention has been to provide improved lane width control for conveyed articles which eliminates overhead lane guide supports.

BRIEF SUMMARY OF THE INVENTION

To these ends, a preferred embodiment of the invention contemplates the discovery that the infeed lanes of a cartoner are not required to be of uniform width throughout their extension. Where containers or articles are to be metered and separated, at least from the infeed lanes, it is only necessary that their spacing be consistent and repeatable in the area in which the metering and segregating devices will be applied to articles in the lanes. Accordingly, the invention contemplates infeed lanes, each having a relatively wide upstream width sufficient to accommodate the largest articles to be handled, and a relatively narrow downstream lane width, defined by lane width inserts applied to stationary and non-adjustable lane guides and in the lane to orient articles in single file for metering and segregation. The insert and opposed lane guide define an operative lane width approximately equal to container or article diameter plus an allowable tolerance to orient articles for movement in a single file line, one after another, with the spaces therebetween on predictable centers which are preferably an approximate function of the article diameter.

In other words, the infeed lanes at their upstream portions are wider than the downstream lane portions where the lane-narrowing inserts are used in the metering and segregating portion of the lane. While upstream portions of the lanes are wide enough to accommodate the largest articles to be cartoned, they are not so wide as to permit "A" pattern bridging of the smallest articles to be cartoned. A wide range of container sizes can thus be handled in the lanes with the inserts used downstream being selected based on the parameters of the particular containers to be cartoned to produce predictable single file orientation.

The noted lane inserts thus preferably extend in a downstream direction from a point just upstream of where the metering or segregating device intercepts the lane to preferably a downstream position near where the articles are discharged from the lanes. Preferably the inserts comprise elements easily and releaseably mounted on the lane facing surface of fixed lane guides. Varied interchangeable inserts are used for articles of varied dimensions.

Where the infeed lanes are inclined or angled toward the downstream machine direction of the associated cartoner, the lane guide inserts of the invention are preferably disposed on the upstream lane guide for that lane. In this manner, the conveying pressure on the articles is asserted against the surface of a fixed lane guide with the insert defining the lane width on the upstream or reduced pressure side of the lane.

In another aspect of the invention, the lane guide insert can be oriented on the downstream lane guide, or a further lane guide insert configured to accommodate a particular article configuration could be disposed on the downstream lane guide.

Preferably, the inserts are provided with pins extending from rear surfaces thereof to drop into slots having downstream inclined bottoms so the inserts are easily assembled or removed from the fixed guides or changeover to easily accommodate different sized or configured articles.

These and other objects and advantages will become readily apparent from the following detailed description of a preferred embodiment of the invention, and from the drawings in which:

DETAILED DESCRIPTION OF THE INVENTION

Figure 1:
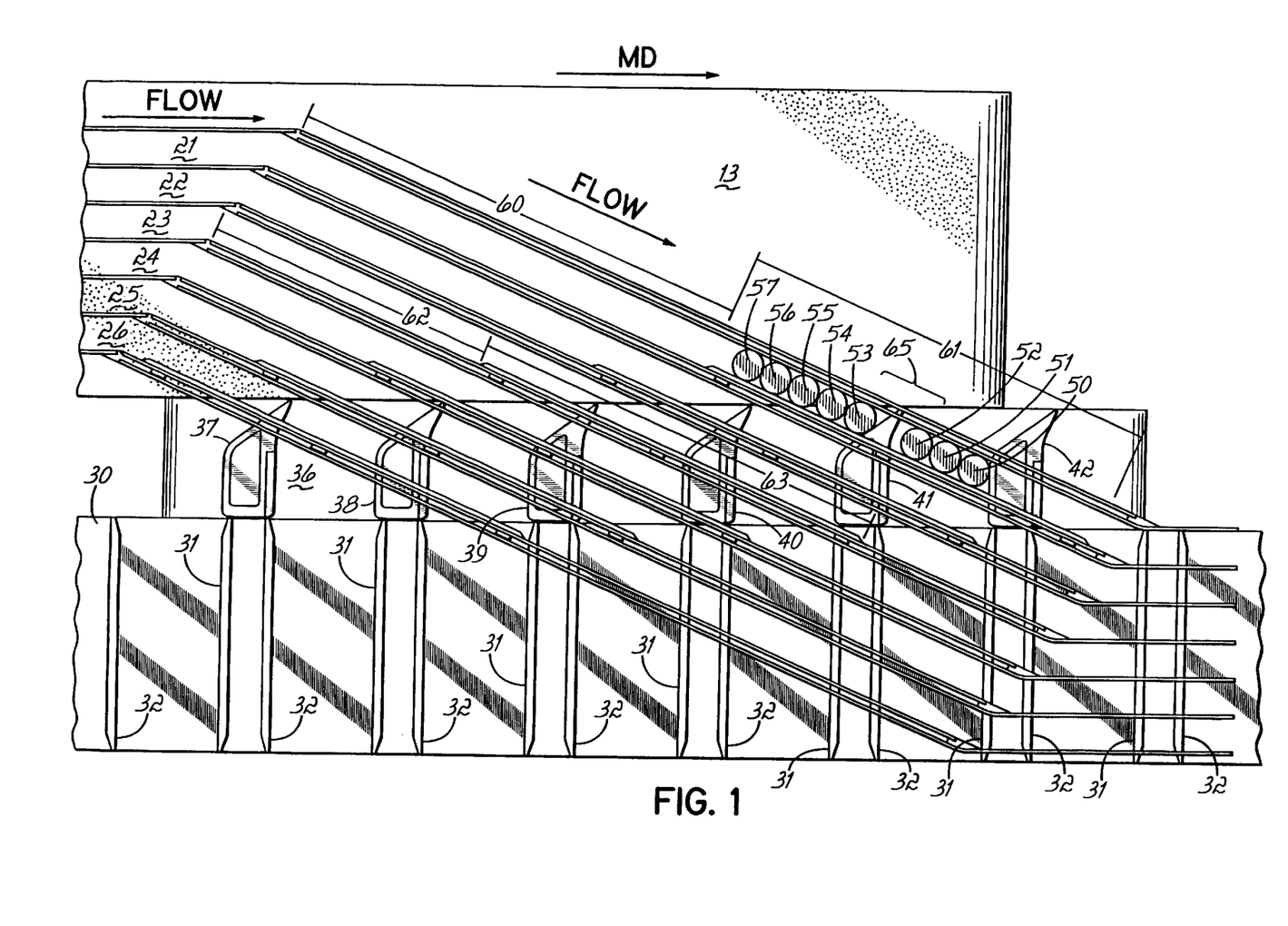
FIG. 1 is a plan view of an article or container infeed area of a cartoner according to the invention.
Figure 1A:
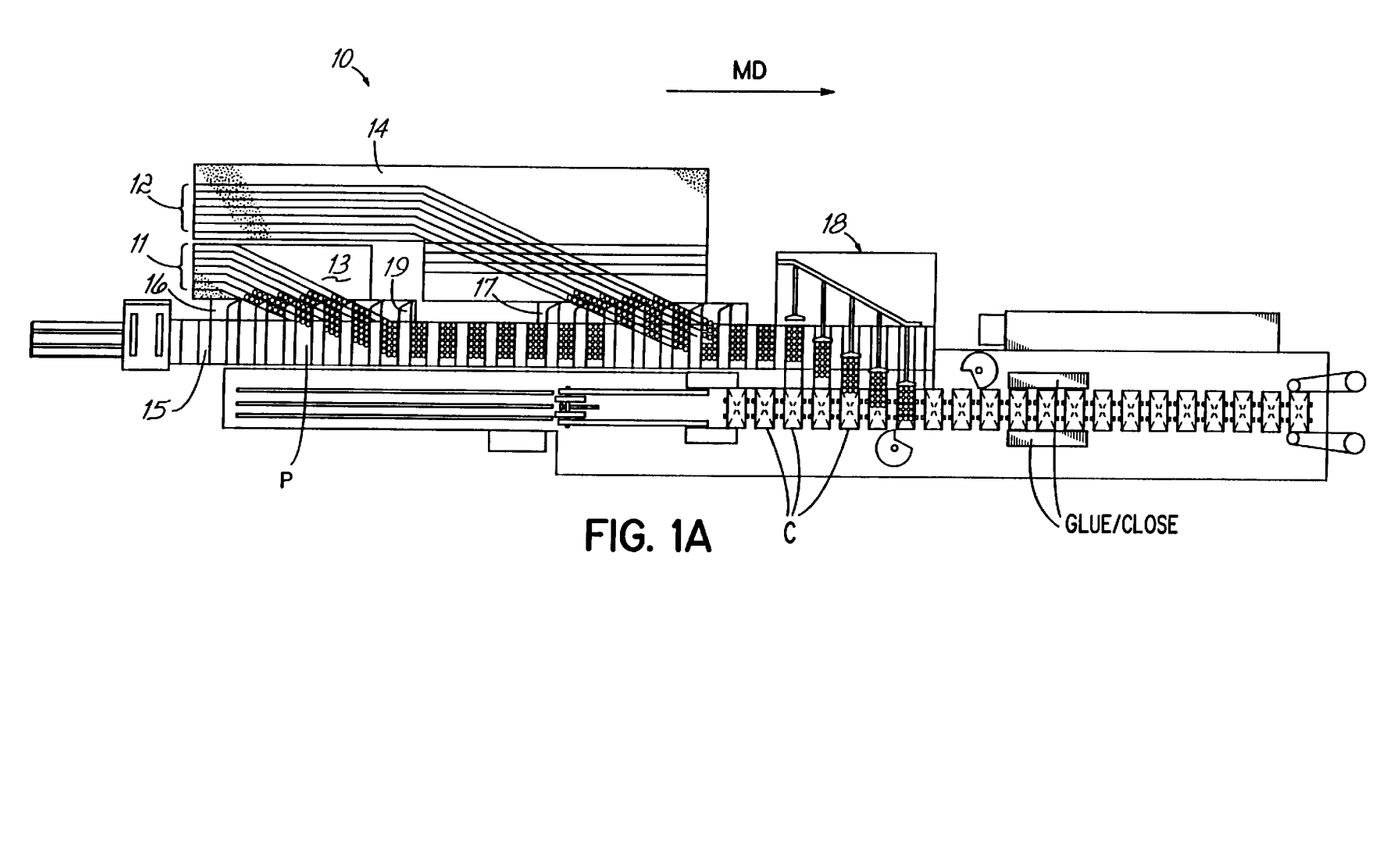
FIG. 1A is an illustrative plan view of a cartoner with which the invention may be used.

FIG. 1A of the drawings illustrates a cartoner 10 which is one type of cartoner with which the invention described herein could be utilized. Cartoner 10 is particularly adapted for combining upper and lower groups of articles such as cans into individual buckets of a bucket conveyor 15 from where the stacked groups are pushed into the open ends of a carton, which is then glued and closed. Accordingly, FIG. 1A illustrates a lower group infeed 11 comprising six infeed lanes and an upper group infeed 12 also comprising a plurality of six lanes, for example.

The lanes of the lower group infeed 11 are angled inwardly toward the machine direction which is illustrated by the arrow MD. As the underlying conveyor 13 moves in the machine direction MD, the cans in the various lanes are urged against the downstream lane guides which define the lanes so that they have a downstream component of motion within the lanes in an inclined direction along the extension of the lanes toward a bucket conveyor 15.

At downstream discharge ends of the various lanes of the lower group infeed 11, a transfer conveyor 16 carries transfer guides 19 which intersect the lanes and segregates and meters a select number of cans from the immediately upstream cans in the infeed lanes. These cans are formed into rows which move transversely into individual buckets of the bucket conveyor 15 and are conveyed downstream.

The operation of the upper group infeed 12 is similar, with the motion of conveyor 14 conveying cans through the lanes forming the upper group infeed 12, which are also inclined at an angle to the direction MD of the cartoner. A second intermediate transfer conveyor 17 intersects the inclined infeed lanes of the upper group infeed 12, meters and segregates cans in those lanes from cans immediately upstream thereof.

The rows so formed are then moved transversely into the buckets of the bucket conveyor 15, with the upper group being placed on a partition P which is disposed on the top of the lower group of cans. Thereafter, a stacked group of cans is urged by a barrel loader 18 into cartons C. Once filled, the cartons are conveyed downstream, where they are glued and closed and then conveyed for further handling.

The details of a cartoner 10 as disclosed in FIG. 1A are more particularly set forth in United States Patent Application filed by application on May 31, 2000, entitled "CARTONER WITH INTERMEDIATE TRANSFER" naming John M. Paselsky and Matthew R. Lukes as inventors. That application is expressly incorporated herein by reference for the purpose of illustrating an exemplary cartoner with which the invention of this application can be utilized.

Turning now to FIG. 1 of the drawings, it will be appreciated that FIG. 1 illustrates the downstream ends of a plurality of article infeed lanes, such as the six lanes 21–26. Articles move through the lanes in the direction of the arrows marked "FLOW", first parallel to the machine direction MD and then in an inclined direction to the machine direction MD and toward a bucket conveyor 30 comprising a plurality of buckets, each having leading walls 31 and trailing walls 32, for example.

Intermediate transfer conveyor 36 is oriented at the side of bucket conveyor 30 and carries a plurality of intermediate transfer guides, such as 37, 38, 39, 40, 41 and 42 thereon.

These guides are oriented on the intermediate transfer conveyor 36 so as to intersect with the respective lanes 21–26 and with articles therein, thereby metering and segregating articles in the downstream portions of the lane from articles immediately upstream thereof.

As an example, as shown in FIG. 1, a transfer guide 41 enters spaces between the articles, such as cans 52, 53, to segregate, for example, a row of three cans 50–52, from cans 53–57 and any further upstream cans, for example, in lane 21.

Thereafter, continued motion of the intermediate transfer conveyor 36 in the machine direction moves intermediate transfer guide 40 into the space between cans 55, 56, thereby segregating another row of cans 53–55 from immediate upstream cans 56, 57 and so on, all as described in the aforementioned pending patent application.

Once the rows of cans are so formed, they exit the ends of the lane, such as at lane 21, in a position generally between leading and trailing walls 31, 32 of a bucket on the bucket conveyor 30, thus forming the last row of cans for the particular group.

In a likewise fashion, it will be appreciated that successive intermediate transfer guides such as 38–42 engage various cans or articles in the respective lanes 26–21 to form successive rows of cans for grouping in buckets on the bucket conveyor 30.

It will be appreciated that each lane 21–26 is disposed at an angle with respect to the machine direction and comprises an upstream portion 60 and an article metering and segregating portion 61, as illustrated in FIG. 1. With respect to lanes 21–26, it will be appreciated that the article metering and segregating portion comprises that portion of any respective lane through which articles therein are intersected by an intermediate transfer guide, such as one of the guides 37–42, and continues downstream until the metered and segregated row of cans is introduced to a bucket of the bucket conveyor 30.

Accordingly, each of the lanes defines, in part, and particularly in the article segregating and metering portion, a station wherein the articles are segregated or metered from cans which are immediately upstream thereof in the same lane. Accordingly, the article segregating and metering portion 61 of each of the respective lanes defines a station wherein the forward hook of the intermediate transfer guide (37–42), intersects the lane at a location where there is a space between adjacent cans to separate the downstream can from the immediately following upstream can and serves to segregate the cans preceding the immediately downstream engaged can from the cans in the immediate upstream infeed lane.

Accordingly, it will be appreciated that it is in this station or portion 61 of each lane wherein the cans or articles must be predictably aligned in order to accommodate the insertion of transfer guide 37–42, for example, between the cans for metering and segregating purposes.

Figure 5:
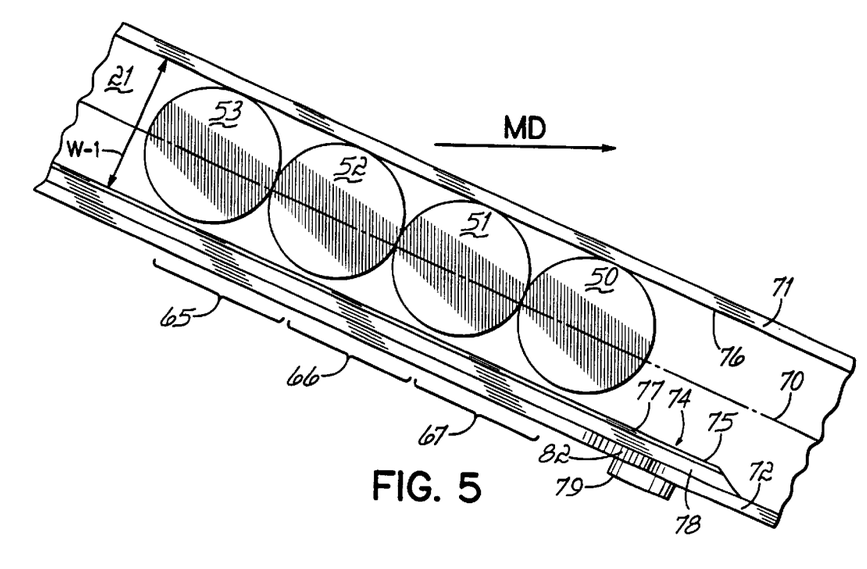
FIG. 5 is an illustrative plan view of the invention similar to FIG. 1 but illustrating details of article flow in one lane only.

Brief reference to FIG. 5 illustrates, for example, spaces, such as spaces 65, between cans, such as can 52 and can 53, for example. It will also be appreciated that there are similar spaces, i.e. 66, between cans 51 and 52 and space 67 between cans 50 and 51, for example. For illustrative purposes, it will be appreciated that infeed lane 21 includes a lane center line 70 which is inclined at an angle to the machine direction MD. It will further be appreciated that the lane 21 is defined primarily by a downstream lane guide 71 and an opposite parallel upstream lane guide 72. These are preferably but not necessarily mounted in fixed position over an infeed conveyor, such as infeed conveyor 13, for example, and extend over an intermediate transfer conveyor 36 and over at least a portion of the bucket conveyor 30, all as shown in FIG. 1.

Movement of the infeed conveyor 13 in the machine direction drives cans, such as cans 50–53, in lane 21. As the conveyor moves, this pressure causes the cans, such as cans 50–53 to move against the downstream lane guide 71 and away from lane guide 72. Thus the cans are generally conveyed against the lane guide 71 and move in a downstream flow direction along the lane center line 70.

In order that the cans are maintained against the lane guide 71, the invention contemplates the insertion of a lane guide insert 74 within the lanes, such as in lane 21, to define between an outer surface 75 thereof and the inner surface 76 of the lane guide 71, a lane width (W-1), which is preferably just slightly greater than the diameter of the conveyed articles, such as cans 50, etc.

Figure 2:
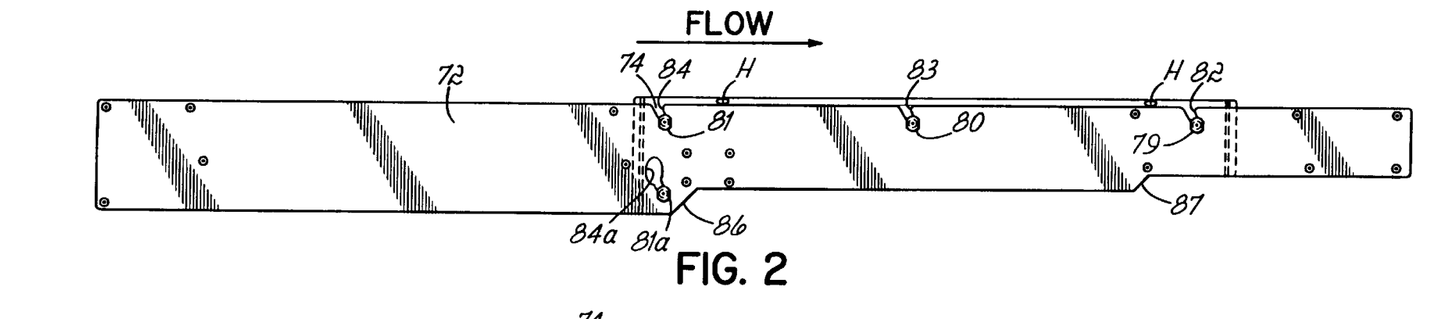
FIG. 2 is an elevational view of the backside of a fixed lane guide showing the insert mounting slots.
Figure 3:
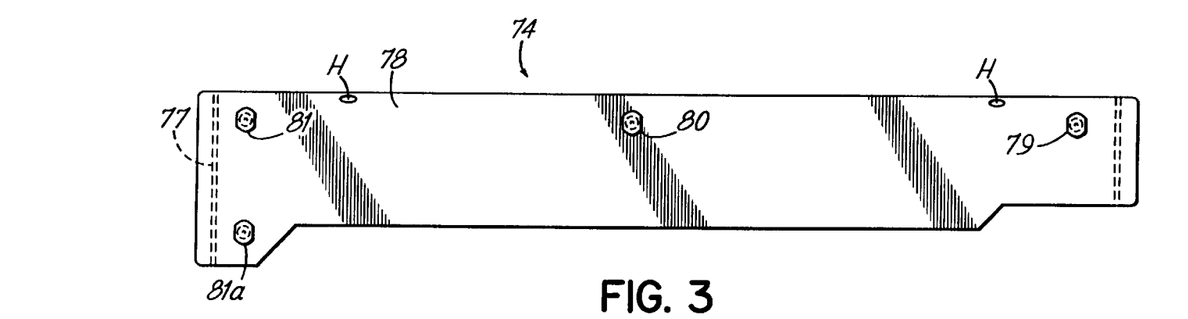
FIG. 3 is an elevational view of the backside of a lane guide insert for use with the lane guide of FIG. 2.
Figure 3A:
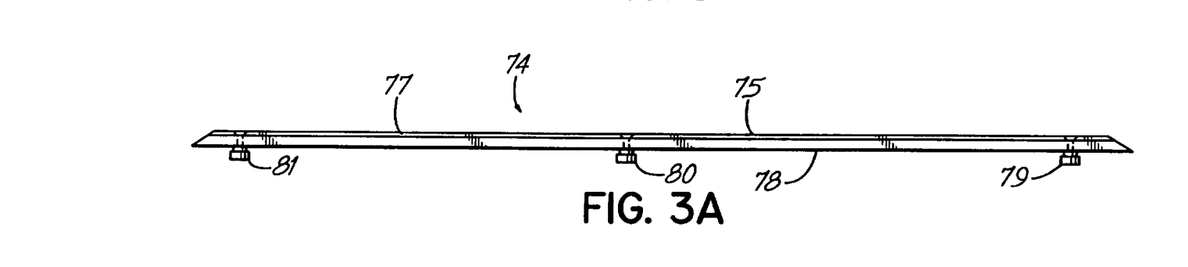
FIG. 3A is a plan view of a lane insert of FIG. 3 according to the invention.

As shown in FIGS. 3 and 3A, the lane guide insert 74 includes a preferably stainless steel element 78 and a facing element 77 of preferably ultrahigh molecular weight (UHMW) polyethylene defining the surface 75. Flanged pins 79, 80, 81 and 81a (FIG. 3) extend rearwardly from the insert 74 for mounting the insert on the respective lane guide 72. This is accomplished by positioning the pins 79–81a into respective forwardly inclined slots 82–84a (FIG. 2) and allowing the insert to settle against the lane guide 72 in such a manner that it constricts the lane to a lane width W-1, which is approximately equal to the diameter of an article, such as cans 50–53, for example, plus a desirable tolerance to allow the cans to move through the lanes, such as lane 21, all as illustrated in FIG. 5.

Preferably, but not necessarily, the lane guide insert is manufactured by applying adhesive strips, for example, to the metallic component 78 and thereafter applying the ultrahigh molecular weight component 77 thereto. It may be possible to fully eliminate the component 77 from the lane guide insert or to manufacture the entire lane guide insert from a synthetic material. In any event, it is preferable to chamfer or taper both the upstream and downstream edges of the entire lane guide insert so that articles are easily fed between that insert and the opposite lane guide 72.

It will be appreciated that to facilitate changeover by land of lane guide inserts 74, the insert is wider than the lane guides, such as guide 72, and thus extends slightly above the lane guides as shown in FIG. 2. Moreover, holes "H" are provided in the upper margin of the inserts 74 to facilitate manual handling.

Accordingly, it will be appreciated that lane 21, for example, includes an upstream portion 60 where cans accumulate in the lanes and move downstream in a flow direction at an angle to the machine direction MD to the article or can metering and segregation portion or station 61. In like fashion, the other lanes 22–26 have upstream portions (see portion 62, for example, in lane 23) and downstream article metering and segregation portions such as that portion 63 in lane 23. It will be appreciated that these portions are staggered from one lane to the other, all as illustrated in FIG. 1.

Turning to FIG. 2, it will be appreciated that the lane guide 72 is provided with a relieved or stepped area 86 extending in a downstream or flow direction to a further relieved or stepped area at 87. It will also be appreciated that the lane guide insert, components of which are illustrated in FIGS. 3 and 3A, are provided with similar and corresponding steps. The upstream relieved areas accommodate the transfer guides and the second downstream stepped or relieved areas accommodate passage underneath of the leading and trailing walls 31, 32 of the bucket conveyor 30 moving downstream in the direction MD.

Preferably, it will be appreciated that, as shown, the lane guide insert is coextensive with that portion of the lane guide 72 over which it is placed, and that the lane guide insert does not necessarily extend throughout the entire downstream portion of the lane guide 72.

Turning now briefly to a description of the alignment of articles such as cans, glass containers or the like, in each of the lanes, it will be appreciated that the invention described herein is useful in aligning articles of rounded or curved shape within the particular lanes.

In the past, it will be appreciated that these lanes have been formed by lane guides somewhat similar to those described herein, but which were mounted on various frames and other structures so as to be adjustable toward and away from each other, in order that the width of the entire length of the lanes could be moved toward the outer dimensions of the articles conveyed therethrough, so as to position them in single file, one after the other, and maintain them in that alignment so that there are reasonably predictable spaces between the articles in which transfer guides or other metering or segregation apparatus can be inserted.

In accordance with this invention, however, applicant has discovered that it is not necessary to maintain such alignment rearwardly or upstream in each lane throughout the entire length of the lane. Instead, it is only necessary that such alignment be maintained throughout that extent or portion of the lane in which the metering and segregation will take place. In other words, it is only necessary to place the cans in single file where it is necessary to predictably define consistent spaces between the cans for insertion of metering or segregation means.

According to the invention then, it is possible to utilize lane guides which are spaced apart a certain distance, to allow articles in the lanes to somewhat be staggered upon themselves, until that time in which the articles will be subjected to the segregating or metering apparatus, such as represented by the intermediate transfer conveyor 36.

Figure 4:
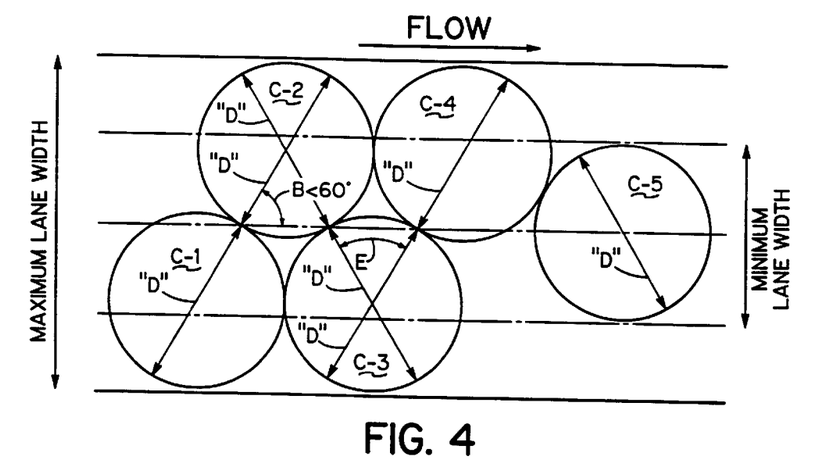
FIG. 4 is a diagrammatic illustration of a conventional "A" pattern bridge and illustrates approximate maximum and minimum lane widths for articles of a given diameter.

At the same time, it is appreciated that if the lane guides are spaced too widely apart, the articles may bridge in an undesirable fashion and cause various jams. Attention is directed to FIG. 4 in this regard, which illustrates minimum and maximum lane widths as contemplated by this invention.

The minimum lane width is contemplated by this invention then, and as illustrated in FIG. 4. It will be that width which is essentially equivalent to the diameter of the largest cylindrical article to be conveyed, for example, plus some slight tolerance allowed to make sure that the article can move freely downstream between the two confining or lane defining guides. Such an article, for example, is shown as a can, C-5, at the right hand side of FIG. 4 and the minimum lane width desired for any particular lane then will be that width which just allows a can, such as can C-5, to pass through the lane.

Parenthetically, it will also be appreciated that this minimum lane width is an optimum width for aligning cans in single file as they are to be metered and segregated. Thus momentarily referring to FIG. 5, it will be appreciated that the minimum lane width can be that width which is essentially equal to width W-1 as shown in FIG. 5, for example, and which is defined by the inner face 76 of the lane guide 71 and the interfacing face 75 of the lane guide insert 74.

Returning now to FIG. 4, however, the maximum lane width is illustrated as shown in the drawing. It will be appreciated and is well known in the industry that a plurality of articles may assume, when staggered and provided that they are not otherwise confined, an orientation referred to in the industry as an "A" pattern bridge. This can occur with respect to cylindrically shaped articles, for example, such as those shown at C1, C2, C3 and C4 in FIG. 4 when a line drawn between the centers of the article form an angle, such as an angle B with the direction of flow (i.e. such as depicted by center line 70) and which is equal to or greater than 60 degrees. When this occurs an "A" pattern bridge might be formed as shown, for example between articles C-1 to C-4 in FIG. 4, which could block a lane confined by guides disposed beyond the maximum lane width as shown. For purposes of illustration then, the maximum lane width is defined as that lane width between two opposed parallel lane guides wherein a line drawn between the centers of cylindrical articles in the lane forms an angle B of less than 60 degrees with respect to the center line or direction or flow of the lane.

It will be appreciated that each of the cylindrically shaped articles C-1 to C-4, as shown in FIG. 4, have a diameter D which is essentially equal. It will also be appreciated that as the lane width narrows, for example, the angle between lines which are cast through the centers of immediately succeeding articles, regardless of their degree of stagger, is represented by the angle E. This angle will increase as angle B decreases and will approach 180 degrees as the articles are confined toward a single file condition, such as when confined between lane guides forming a minimum lane width as illustrated in FIG. 4, to accommodate an article such as article C-5.

Also with regard to FIG. 4, it will be appreciated that with respect to a flow direction from left to right, container C-3 follows C-4, container C-2 follows C-3 and container C-1 essentially follows container C-2. Accordingly, if the containers in the lane represented by the maximum lane width are eventually to be metered and segregated by, for example, a star wheel or a transfer guide such as described herein, it will be necessary to create a space for insertion of such mechanism between successive containers, such as between containers C-1 and C-2, between containers C-2 and C-3, or between containers C-3 and C-4.

As illustrated in FIG. 4, when the lane width approaches maximum lane width, there is essentially no usable space between the successive containers which will permit this to occur. While there is a space, for example, between containers C-1 and C-3 along the outer edge of the lane, any apparatus inserted between that space may well impact container C-2, for example, either destroying that container or perhaps causing a jam of flow in the lane.

Accordingly, it will be appreciated that it is desirable to align the containers in a single file configuration in the station where the containers will be metered and segregated.

Accordingly, and returning to FIG. 1, it will be appreciated that according to the invention, containers in the lanes 21–26 may be staggered, up to a maximum lane width, however, each of the containers is aligned in a single file alignment in the segregation or metering station by virtue of the use of the lane guide insert with respect to each lane, as illustrated in FIG. 1.

In this regard then, it will be appreciated that the invention contemplates the use of lane guide insert 74 to create a minimum width lane which will align articles to be cartoned in essentially a single file alignment. Preferred lane width W-1 is essentially equal to the diameter of the container, or that cylindrical portion of a container to be cartoned, plus a small tolerance to allow for easy passage of the container through the lane yet, at the same time, create repeatable and consistent spaces between each of the aligned single file articles for the insertion of appropriate segregation and/or metering apparatus.

At the same time, it will be appreciated that the upstream portions of the lane, such as portions 60, 62 for example, shown in the respective lanes 21, 23, and the further upstream portions shown parallel to the machine direction in FIG. 1, can be wider. According to the discussion above, however, that maximum width is preferably limited to that width which will accommodate the containers to be cartoned which is not so wide as to permit "A" pattern orientation of the smallest diameter of containers to be cartoned in the system.

Accordingly, it will be appreciated that the invention contemplates an infeed system for a cartoner wherein the initial lane width can be relatively wide within the range described above, and the downstream lane width is narrowed by virtue of the use of a lane guide insert which is selected as a function of the fixed lane width and the ultimate diameter of the articles selected to be cartoned.

In this manner, fixed lane guides such as guides 71, 72 can be utilized without all of the prior lane guide adjustment mechanisms and framework normally disposed above article conveyors. Once the articles to be cartoned have been selected, appropriate lane guide inserts 74 are selected with the inserts having pre-selected widths which will define within each lane portion, such as portion 61, a lane width which is operable to confine and align the selected articles to be cartoned in single file.

Accordingly, a wide range of article diameters can be handled with merely a changeover of lane guide inserts and without the normally prior required mechanisms for adjusting the spacing between each of the respective lane guides for each lane in the system. Articles can be allowed to be in staggered orientation or configuration within each lane, all the way to a position which is just at or upstream of the predetermined insertion of an article metering or segregation apparatus, such as a transfer guide.

A segregation and/or metering station then extends along the lane for predetermined distance beginning at a point just upstream of the insertion of a metering or segregation guide. Once the articles are metered and segregated and picked up by the associated cartoner such as by buckets of the bucket conveyor 30, for example, the lane guide insert is terminated proximate the downstream end of the station, even though the lane guides can be further extended.

Accordingly, the lane guide insert extends from a position just upstream of the segregation and/or metering station through that station, to a point just downstream thereof.

Moreover, it will be appreciated that the lane guide insert is mounted on the lane guide 72, which is preferably that guide with respect to any lane which is in an upstream position relative to the opposite lane forming guide which is in a downstream position. In this manner, as the articles are conveyed in a flow direction, but are urged in a machine direction by an underlying conveyor, the articles tend to ride on the inner lane surface 76 of the downstream guide 71 and are not pressed by this conveying pressure against the lane guide insert 74, which merely fills up the lane and ensures the appropriate alignment of the articles, Turning now to FIG. 6, another aspect of the invention is illustrated, It will be appreciated that not all articles to be cartoned are purely cylindrical in shape. Accordingly, while the invention is useful in cartoning articles such as cylindrically-shaped cans or glass bottles, it may also be useful in cartoning other types of articles made from these or other materials. For example, profiled containers of the type used in containing various foods and other products could be handled in an article feeding apparatus according to the invention. In this regard, it has also been found useful to incorporate into the downstream guide of each lane, and through the article segregating and metering portion such as at 61, a further lane guide insert such as that shown at 95 in FIG. 6.

Figure 6:
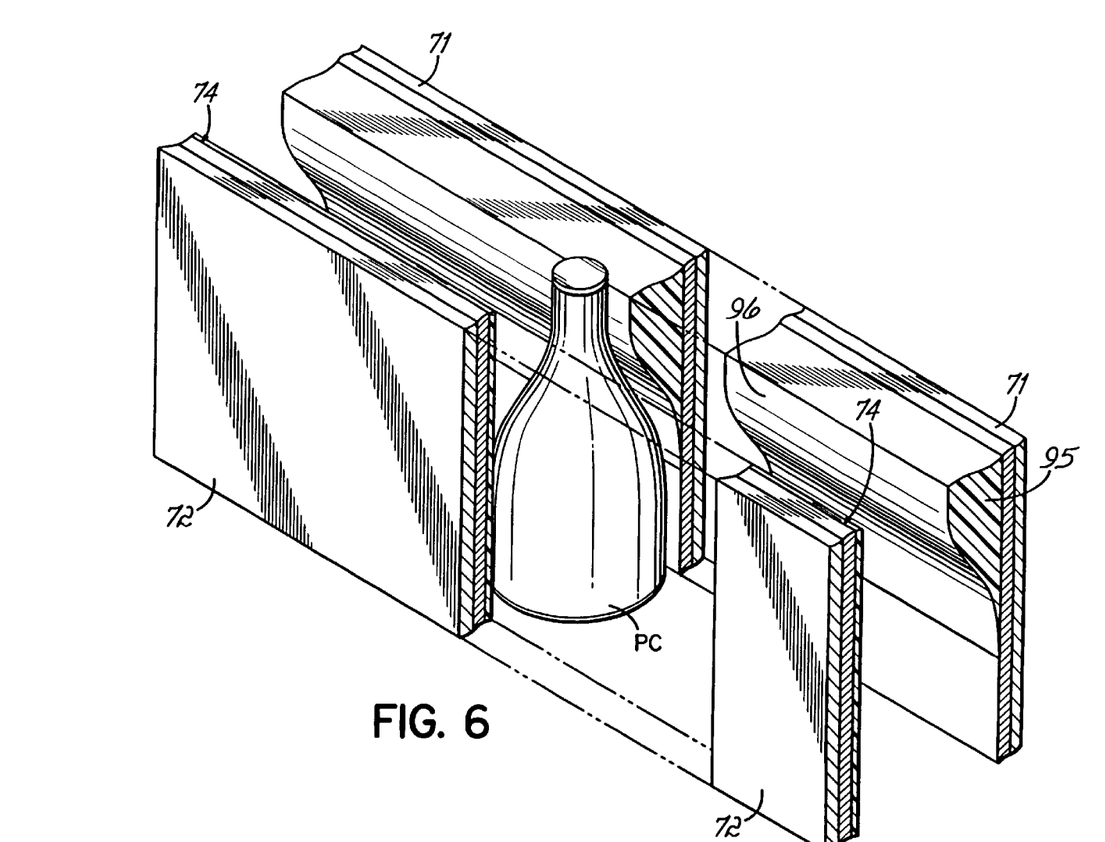
FIG. 6 is a perspective illustration of an alternative embodiment of the invention showing a lane guide insert accommodating a non-cylindrical container configuration.

As shown in FIG. 6, a series of profile containers, such as container PC, is conveyed through the lane, which is defined in part by downstream lane guide 71 and upstream lane guide 72. While lane guide insert 74 is utilized to define the appropriate lane width as described above, the additional lane guide insert 95 is configured to engage an upper surface of the profile portion of the container to maintain it in an upright condition.

Accordingly, lane guide insert 95 includes an article engaging surface 96, which may be configured to conform to a profile surface of the profile container PC, in order to maintain that container in an upright and erect position during its movement through the segregating and metering portion 61 of the lane.

It will be appreciated that, while not shown, the configured lane guide insert 95 can be attached to a lane guide 71 in the same manner as lane guide insert is attached to lane guide 72.

Accordingly, it will be appreciated the invention contemplates a much improved infeed apparatus for use in a cartoner, for example, wherein is recognized that articles to be cartoned need not be aligned in direct single file throughout the entire extension of the infeed lanes, but may be allowed to be in staggered condition until just prior to their entry into a segregation and metering station. This permits the use of fixed lane guides and eliminates the prior practice of mounting the lane guides beneath the extensive and complicated supporting and adjustment frames. Lane guide inserts are selected to handle particular articles to be cartoned and the upstream lane width thus has a maximum width just less than that which would allow articles of the smallest diameter to be cartoned to form an "A" pattern bridge within the lane and thus jam it up.

At the same time, the lane guide inserts of varying thicknesses as a function of the articles to be cartoned, are selectively used in the lanes to accommodate a wide range of articles, yet between fixed lane guides. Accordingly, access to the infeed area of the cartoner is greatly facilitated so that articles which are tipped, mis-oriented, damaged or broken can be easily removed and other adjustments can be easily made without removing an entire overframe structure.

It should also be appreciated that other means other than the insert 74 could be utilized in order to adjust the lane guides. For example, in certain applications, it may be desirable to simply modify a lane guide only in the segregating and metering portion 61, for example, to be relatively movable toward and away from the opposite lane guide to adjust the lane guide width at that station according to the invention as a function of the diameter or size of the articles to be cartoned or handled in the lane. Other adjustable means might also be utilized, such as an inflatable lane guide throughout the length of the metering and segregation portion 61. Air pressure or any other suitable means for adjusting or changing the width of the lane in this area could be used within the scope of the invention.

These and other alterations and modifications will become readily apparent to those of ordinary skill in the art without departing from the scope of the invention and applicant intends to be bound only by the claims appended hereto.

We claim:

1. An article feeding apparatus for aligning selected articles of known diameter in lanes extending in a direction, said apparatus comprising:
   a plurality of pairs of lane guides, each pair of lane guides defining between them a lane having one lane width;
   at least two respective lane guide inserts disposed within at least two of said lanes between respective guides defining respective lanes to operably define respective second narrower lane widths in a down stream portion of the lanes than said one lane width;
   wherein said feeding apparatus includes apparatus for at least one of metering and separating articles in said lane from articles upstream thereof at a station and wherein said lane guide inserts extend from a point upstream of said station to a point downstream thereof, with said articles being oriented single file in said station,
   said apparatus for one of metering and separating articles comprising a transfer guide movable at an angle to and across said lanes from one to another, in a downstream direction,
   and said lane guide inserts being longer in lanes first traversed by said transfer guide than lane guides being later traversed thereby.

2. Apparatus as in claim 1, wherein at least one of said lane guides defining each respective lane is fixed.

3. Apparatus as in claim 2 wherein both of said lane guides defining each respective lane are fixed.

4. Apparatus as in claim 3 wherein:
   said one lane width is wide enough to accommodate passage therein of selected articles having the largest diameter of selected articles to be aligned and not so wide to permit "A" pattern orientation in said lane of selected articles having the smallest diameter of selected articles to be aligned.

5. Apparatus as in claim 4 wherein said respective lane guides are spaced apart between a maximum and a minimum distance, the minimum being approximately equal to the largest diameter of selected articles to be aligned and the maximum being less than that which would permit "A" pattern orientation of the smallest diameter of selected articles to be aligned.

6. Apparatus as in claim 1 wherein said lane guide inserts each have an upstream end disposed in said respective lanes proximate said station.

7. Apparatus as in claim 6 wherein said lane guide inserts each have a downstream end disposed proximate said station and downstream thereof.

8. Apparatus as in claim 1 wherein at least one of said lane guides defining each lane is fixed and wherein said respective lane guide removably mounted on fixed lane guides.

9. Apparatus as in claim 8 wherein said lane guides are inclined across a selected machine direction of said apparatus, one of said lane guides being oriented upstream of the other lane guide and said inserts being removably mounted on said respective upstream lane guides of each respective lane.

10. Apparatus as in claim 1 wherein said lane guide inserts comprise a first elongated element including a lower edge having a relieved area extending in the direction of extension of said respective lanes.

11. Apparatus as in claim 10 wherein each said lane guide insert includes mounting pins and is mounted on a lane guide having inclined slots for removably receiving said pins.

12. Apparatus as in claim 1 wherein said lane guide inserts each comprise a first elongated metallic element and a second elongated synthetic element substantially coextensive with said first element.

13. Apparatus as in claim 1 further including a second lane guide insert for disposition within each said lane having another lane guide insert and defining said lane with said lane guide insert.

14. Apparatus as in claim 13 wherein each said second lane guide insert includes an article contact surface conforming to the configuration of a surface of articles to be aligned.

15. An article feeding apparatus for aligning selected articles of diameter in a plurality of lanes extending in a direction, for article metering or separation and comprising:
   at least two lane guides defining each of a plurality of respective lanes, said guides being spaced apart a distance to accommodate movement therebetween of the largest diameter articles to be aligned, but not such a distance as to allow an "A" pattern orientation of the smallest diameter articles to be aligned;
   a lane guide insert selectively mountable on one of said lane guides of each lane to reduce the width of a downstream portion of said lane to a width sufficient to orient articles in single file in said lane,
   wherein said feeding apparatus includes apparatus for at least one of metering and separating articles in said lanes from articles upstream thereof at a station and wherein said lane guide inserts extend from a point upstream of said station to a point downstream thereof, with said articles being oriented single file in said station,
   said apparatus for one of metering and separating articles comprising a transfer guide movable at an angle to and across said lanes from one to another, in a downstream direction,
   and said lane guide inserts being longer in lanes first traversed by said transfer guide than lane guides being later traversed thereby.

16. Apparatus as in claim 15 wherein said lane guide width of said respective lanes to a distance greater than but at diameter of selected articles to be aligned.

17. An article feeding apparatus for aligning articles of selected diameter in a plurality of lanes extending in a direction for article metering or separation, and comprising:
   at least two lane guides defining each lane, respective lane guides defining each lane spaced apart a distance within a range comprising a minimum of at least a diameter of the largest article to be aligned and a maximum distance defined by the width produced between outer surfaces of adjacent staggered smallest articles to be aligned with a line between their centers inclined at no more than 60 degrees from the direction of said each lane;
   at least one lane guide insert mounted within each lane to confine the width of a downstream potion of each lane to a distance approximately equal to the diameter of an article to be aligned to orient such articles in single file therein,
   wherein said feeding apparatus includes apparatus for at least one of metering and separating articles in said lanes from articles upstream thereof at a station and wherein said lane guide inserts extend from a point upstream of said station to a point downstream thereof, with said articles being oriented single file in said station, said apparatus for one of metering and separating articles comprising a transfer guide movable at an angle to and across said lanes from one to another, in a downstream direction, and said lane guide inserts being longer in lanes first traversed by said transfer guide than lane guides being later traversed thereby.

18. Apparatus as in claim 17 wherein said lanes are defined by spaced apart fixed lane guides and said lane guide insert in each lane is releasably mounted on one of said lane guides.

19. Apparatus as in claim 18 wherein said lane guides for each lane are oriented at an angle with respect to a selected machine direction with a first lane guide on a downstream side of said lane and a second lane guide on an upstream side of said lane, said lane guide inserts being releasably mountable on said second lane guide in each lane.

20. Apparatus as in claim 1 wherein articles move through said apparatus in a path, said path passing from upstream said lane guide inserts, between at least one lane guide and at least one lane guide insert in a lane, and downstream from said lane guide insert in said lane, and said path being wider than said second narrower lane width both upstream and downstream of each said lane guide insert.

21. In a method of orienting articles received from lanes having a first width into respective single file lanes having a narrower width than said first width and approximately equal to a diameter of said articles, wherein said articles are engaged by a member extending therebetween to separate one from another, the step of conveying articles in lanes having said first width, confining said articles into single file in said single file lanes by engaging articles with lane guide inserts in said lanes, inserting said member between articles in said single file lane and thereafter transferring articles in lanes having a width greater than said single file lane, wherein the step of confining said articles comprises confining articles over a longer distance in selected lanes than in other lanes with lane guide inserts of varied length in said respective lanes.

* * * * *

UNITED STATES PATENT AND TRADEMARK OFFICE
CERTIFICATE OF CORRECTION

PATENT NO.    : 6,516,938 B1
DATED         : February 11, 2003
INVENTOR(S)   : John M. Paselsky and Matthew R. Lukes It is certified that error appears in the above-identified patent and that said Letters Patent is hereby corrected as shown below:

Column 6,
Line 44, "to facilitate changeover by land of" should read -- to facilitate changeover by hand of --.
Line 66, "the lane guide inserts components of which are illustrated in FIGS. 3 and 3A, are provided with" should read -- the lane guide insert, components of which are illustrated in FIGS. 3 and 3A, are provided with --.

Column 7,
Line 49, "The minimum lane width is contemplated by this invention then, and as illustrated in FIG 4." should read -- The minimum lane width is contemplated by this invention then, and as illustrated in FIG 4, it --.

Column 8,
Line 20, "with respect to the center line or direction or flow of the lane." should read -- with respect to the center line or direction of flow of the lane. --.

Column 9,
Line 67, "is illustrated, It will" should read -- is illustrated. It will --.

Column 10,
Line 33, "wherein is recognized that articles to be" should read -- wherein it is recognized that articles to be --.

Column 11,
Lines 13-16, "in a down stream portion of the lanes than said one lane width;
    wherein said feeding apparatus includes apparatus for at least one of metering and separating articles in said lane from" should read -- in a downstream portion of the lanes than said one lane width;
    wherein said feeding apparatus includes apparatus for at least one of metering and separating articles in said lanes from --.
Line 54, "wherein said respective lane guide removably mounted on fixed lane guides." should read -- wherein said respective lane guide insert is removably mounted on fixed lane guides. --.

UNITED STATES PATENT AND TRADEMARK OFFICE
CERTIFICATE OF CORRECTION

PATENT NO.   : 6,516,938 B1
DATED        : February 11, 2003
INVENTOR(S)  : John M. Paselsky and Matthew R. Lukes It is certified that error appears in the above-identified patent and that said Letters Patent is hereby corrected as shown below:

<u>Column 12,</u>
Lines 40-43, "Apparatus as in claim 15 wherein said lane guide width of said respective lanes to a distance greater that but at diameter of selected articles to be aligned." should read -- Apparatus as in claim 15 wherein said lane guide inserts reduce the width of said respective lanes to a distance greater than but approximate to the diameter of selected articles to be aligned. --.
Line 57, "potion" should read -- portion --.

Signed and Sealed this

Twenty-third Day of December, 2003

JAMES E. ROGAN
*Director of the United States Patent and Trademark Office*